United States Patent [19]
Brininstool

[11] Patent Number: 5,589,937
[45] Date of Patent: Dec. 31, 1996

[54] FIBER OPTIC SELF-MULTIPLEXING AMPLIFIED RING TRANSDUCER AND FORCE TRANSFER SENSOR WITH PRESSURE COMPENSATION

[75] Inventor: Michael R. Brininstool, La Jolla, Calif.

[73] Assignee: The United States of America as represented by the Secretary of the Navy, Washington, D.C.

[21] Appl. No.: 434,366

[22] Filed: May 2, 1995

Related U.S. Application Data

[63] Continuation-in-part of Ser. No. 339,992, Oct. 31, 1994, abandoned.

[51] Int. Cl.$^6$ .................. G01B 9/02; G01L 1/24
[52] U.S. Cl. .............. 356/352; 356/345; 250/227.14
[58] Field of Search ................... 356/345, 380, 356/352; 250/227.14, 227.18, 227.19, 227.27

[56] References Cited

U.S. PATENT DOCUMENTS

| | | |
|---|---|---|
| 4,245,223 | 1/1981 | Evans . |
| 4,319,186 | 3/1982 | Kingsley . |
| 4,442,350 | 4/1984 | Rashleigh . |
| 4,451,151 | 5/1984 | Huignard . |
| 4,525,818 | 6/1985 | Cielo et al. . |
| 4,534,222 | 8/1985 | Finch et al. . |
| 4,648,082 | 3/1987 | Savit . |
| 4,679,936 | 7/1987 | Gerharz . |
| 4,751,690 | 6/1988 | Krueger . |
| 4,799,752 | 1/1989 | Carome . |
| 4,835,778 | 5/1989 | Kafka et al. . |
| 4,893,930 | 1/1990 | Garrett et al. . |
| 4,928,004 | 5/1990 | Zimmermann et al. . |
| 4,950,883 | 8/1990 | Glenn . |
| 4,951,271 | 8/1990 | Garrett et al. . |
| 5,051,965 | 9/1991 | Poorman . |
| 5,056,884 | 10/1991 | Quinlan, Jr. . |
| 5,140,456 | 8/1992 | Huber . |
| 5,155,707 | 10/1992 | Fisher . |
| 5,231,611 | 7/1993 | Laznicka, Jr. . |
| 5,247,490 | 9/1993 | Goepel et al. . |
| 5,253,222 | 10/1993 | Danver et al. . |

*Primary Examiner*—Samuel A. Turner
*Assistant Examiner*—Amanda Merlino
*Attorney, Agent, or Firm*—Harvey Fendelman; Peter A. Lipovsky; Michael A. Kagan

[57] ABSTRACT

A fiber optic sensor system includes a first optical power source which injects a light pulse into an optical fiber loop system. The light pulse circulates in the optical fiber loop system at a circulation frequency. The optical fiber loop system includes a transducer which modulates the circulation frequency in response to detecting a changing physical condition, a filter, polarization controller, an isolator, and an optical fiber gain medium for amplifying the light pulse. A second optical power source provides optical energy to the optical fiber gain medium. A detector system transforms a portion of the light pulse received from the optical fiber loop system into an output signal representing the circulation frequency.

29 Claims, 7 Drawing Sheets

FIBER OPTIC SELF-MULTIPLEXING AMPLIFIED RING TRANSDUCER AND FORCE TRANSFER SENSOR WITH PRESSURE COMPENSATION

CROSS REFERENCE TO RELATED APPLICATIONS

This application is a continuation in part of co-pending U.S. patent application Ser. No. 08/339,992, entitled "Fiber Optic Self-Multiplexing Amplified Ring Transducer", filed on Oct. 31, 1994 in the name of Michael R. Brininstool and incorporated herein by reference in its entirety.

BACKGROUND OF THE INVENTION

The invention relates to the field of fiber optic sensors, and more particularly, to a fiber optic sensor system in which a transducer modulates the frequency of an optical pulse circulating in a loop of optical fiber to convey sensor data.

Optical fiber technology is replacing electrically based transducer systems in many applications. Fiber optic sensor systems offer advantages such as geometric versatility, low-loss telemetry, high bandwidth, immunity to electromagnetic interference, and high sensitivity in comparison to conventional sensor systems interconnected by wire cables.

One class of fiber optic sensors is based on comparing the phase shift of light propagated through an optical fiber transducer by comparison with the phase of light propagated through a reference optical fiber. A phase shift results when the optical fiber transducer retards light propagation in response to the physical effect or condition which is being transduced. Some disadvantages of sensor systems which rely on phase shift measurement are that they require coherent light, and careful control of system geometry is required to measure the relative phase of the sensing light and the reference light.

Applications exist in which it is desirable to deploy dozens or hundreds of acoustic transducers in arrays that are towed through the ocean or deployed on the ocean floor. Examples of such applications include seismic exploration and ocean surveillance U.S. Pat. No. 5,051,965, "Acousto-Optical Marine Sensor Array" describes a fiber optic sensor array system based on interferometric measurement of phase shifts occurring as light pulses are propagated successively through a series of fiber optic transducing coils. The system has the desirable feature of enabling signals to be monitored from a large number of acoustic transducers using only two fiber optic signal lines. This is accomplished by multiplexing the return signals from the separate transducers into a single optical fiber. The system requires careful control of the time delay between successive sensors and sufficient coherence of the laser light for measurement of relative phase between successive pulses. However, appropriate time delay is difficult to achieve because path lengths between the sensors must be carefully controlled. Further, laser light coherence restricts the laser sources which can be employed.

Therefore, there is a need for a fiber optic sensor system which can be deployed in a multiplexed array system and which does not rely on measurement of phase shifts of coherent light.

The present invention also relates to sensing arrangements, and it more particularly relates to force transfer sensors with a high frequency filter for use in fiber optic transducers or like devices.

Several fiber-optical acoustic sensors have been described in the recent past and are described below.

In one sensor, two single-mode optical fibers are arranged in the form of an interferometer in which a length of one of the fibers is subjected to a magnetic or acoustic pressure field an forms the sensing arm. The other fiber is shielded from the field and forms the reference arm. Then, by the photo-elastic effect, a phase change is induced in the sensing fiber. Recombining the light from the sensing arm with that from the reference arm results in interference fringes which give a measure of the magnitude of the magnetic field or the magnitude of the acoustic wave. Because the two fiber arms are physically separate, differential environmental conditions face each and seriously affect the interferometer stability. The state of polarization (SOP) of the light emerging from each fiber arm must be correct or the two will not completely interfere.

U.S. Pat. No. 4,442,350 to Rashleigh describes a sensor for detecting the presence of an environmental field condition such as acceleration, temperature change, magnetic or acoustic fields. The field is sensed by interference between two mutually orthogonal polarized eigenmodes in a single monomode optical fiber which may be disposed either linearly or wound on a mandrel made of compliant material for sensing an acoustic field. Polarized light propagated through the optical fiber is detected at its outlet independent of environmentally induced low frequency variations whereby the sensor may be maintained at quadrature and maximum sensitivity.

U.S. Pat. No. 4,951,271 to Garrett et al. discloses an omnidirectional hydrophone having an elastic shell which has a circular cross-section so that the circumference of the shell about different axes changes differentially when the shell is subjected to pressure variations. The differences in circumference are measured by an optical fiber interferometer having one leg wound about the equatorial circumference of the shell and another leg wound about its meridional circumference. The shell may be oblate such that it narrows along one axis and widens along the other when the shell is subjected to a pressure change.

Other fiber optic sensors are described in the following patents, and relate to the general field of the present invention:

U.S. Pat. No. 4,534,222 to Finch et al. relates to a vibration sensor that includes two matched coils of fiber-optic material. When the sensor experiences vibration, a differential pressure is exerted on the two fiber coils. The differential pressure results in a variation in the relative optical path lengths between the two fibers so that light beams transmitted through the two fibers are differently delayed, the phase difference therebetween being a detectable indication of the vibration applied to the sensor.

U.S. Pat. No. 4,893,930 to Garrett et al. relates to a multiple axis, fiber optic interferometer seismic sensor that is enclosed within a case and supported by a plurality of cylindrical silicone rubber mandrels. Each mandrel is wound with a length of optical fiber which has a reflective end and a transmissive end. When the case is displaced, the supports change diameter in response to the relative motion between the seismic mass and the case. This change in diameter is translated to a change in length of the optical fiber, that is responsive to the displacing vibrations.

U.S. Pat. No. 4,950,883 to Glenn describes an arrangement for sensing changes in a monitored parameter. It includes an optical fiber which has at least one sensing fiber length having a sensing portion. Two periodic gratings of the same periodicity are situated in the fiber each at a different end of the sensing fiber length. Such gratings are reflective to a predominant portion of any light that propagates in the fiber and has a wavelength in a stopband range around twice the periodicity. When a particular broadband coherent light is launched into the fiber toward a first grating, the predominant portion of the sensing light is reflected from the first grating and the remainder of the sensing light passes into the sensing fiber length, where resonant buildup of light at certain wavelengths that are located within the stopband range and depend on the length of the sensing portion as influenced by changes in the monitored parameter takes place, and the gratings are rendered substantially transparent to the sending light at the plurality of wavelengths following the buildup. The effect of gratings and of the sensing length on the wavelengths of the light emerging from one of the end portions of the optical fiber is then detected.

U.S. Pat. No. 5,051,965 to Poorman relates to an acousto-optical sensor array which includes a distributed set of optical-fiber sensing coils. A light pulse is launched through the sensing coils in a serial order. The light pulse is cumulatively data modulated by the respective sensing coils and is returned as a time division multiplexed pulse train. The pulse train is split into a first pulse train and a retarded pulse train, such that the retardation time equals the travel-time delay of a light pulse between sensors. The phase shift between the retarded pulse train and the first pulse train is measured and indicates the quantity being sensed.

U.S. Pat. No. 5,056,884 to Quinlan, Jr. describes yet another fiber optical load sensing device, and U.S. Pat. No. 5,247,490 to Goepel et al. relates to a pressure compensated optical acoustic sensor.

SUMMARY OF THE INVENTION

The present invention provides a fiber optic sensor system which includes a first optical power source which injects a light pulse into an optical fiber loop system. The light pulse circulates in the optical fiber loop system at a circulation frequency. The optical fiber loop system includes a transducer which responds to a changing physical condition, resulting in modulation of the circulation frequency, a filter, isolator, polarization controller, and an optical amplifier for amplifying the light pulse. A second optical power source provides optical energy to the optical amplifier. A detector system transforms a portion of the light pulse received from the optical fiber loop system into an output signal representing the circulation frequency.

Another aspect of the present invention provides a multiplexed fiber optic sensor system. Such system includes a first optical power source for generating a light pulse. Multiple optical fiber loop systems coupled to the first optical power source each receive a portion of the light pulse which circulates in each optical fiber loop system at a unique circulation frequency. The optical fiber loop systems each include a transducer which responds to a changing physical condition by modulating the circulation frequency; a polarization controller; filter; isolator; and an optical fiber gain medium for amplifying the portion of the light pulse circulating in the optical fiber loop system. A second optical power source provides optical energy to the optical fiber gain medium in each of the fiber optic loop systems. A detector system receives a portion of the light pulses from the optical fiber loop systems and transforms them into separate output signals representing the circulation frequency of each optical fiber loop system. Thus, the detected circulation frequency represents a particular physical condition.

An advantage of the invention is that it can be operated with incoherent light. A second advantage is that it provides a fiber optic sensor system which has a design selectable fundamental circulation frequency. A third advantage is that the frequency of the signal is modulated in accordance with the physical condition which is transduced. A still further advantage is that multiplexed arrays of fiber optic sensors may be employed in a single system. These and other advantages of the invention will become more readily apparent from the ensuing specification and claims when taken in conjunction with the appended drawings.

The present invention also relates to a new fiber optic sensor for measuring or detecting the presence of an environmental field condition such as under-water acoustic perturbations. The sensor includes a force transfer transducer which may be a force transfer column. The transducer is enclosed within a shell. The invention uses a pressure equalizer for equalizing the interior and exterior shell pressures. An optical fiber is coiled about the transducer. An optical detector detects stress or strain in the optical fiber, resulting from external perturbations.

The sensor is able to operate at various depths or altitudes. Pressure equalization enables the isolation of dynamic external perturbations from other pressure variations. For this purpose, a pressure equalizing valve may be used to allow the equalization of slow changes in static pressures, and the detection of higher frequency perturbations which might emanate from a target source.

Pressure equalization can be obtained through alternative filter designs. One design includes the use of restrictor check valves to maintain equal static pressures, whereby the internal pressure of the sensor equals the ocean ambient pressure. Another design includes the use of a movable piston that reacts to a pressure differential. High frequency source perturbations are filtered by controlling the rate of movement through a viscous damper or dash pot. Other pressure equalization methods are also contemplated by the present invention.

In one embodiment of the present invention, the force transfer transducer or column may include a commercially available polyurethane spring. Other compliant materials such as elastomeric polymers can be used to provide force transfer from external pressure perturbations to stress in the optical fiber.

BRIEF DESCRIPTION OF THE DRAWINGS

The above and other features of the present invention and the manner of attaining them, will become apparent, and the invention itself will be best understood, by reference to the following description and the accompanying drawings, wherein.

Throughout the several figures, like elements are referenced with like reference characters.

DETAILED EMBODIMENT DESCRIPTION

Figure 1:
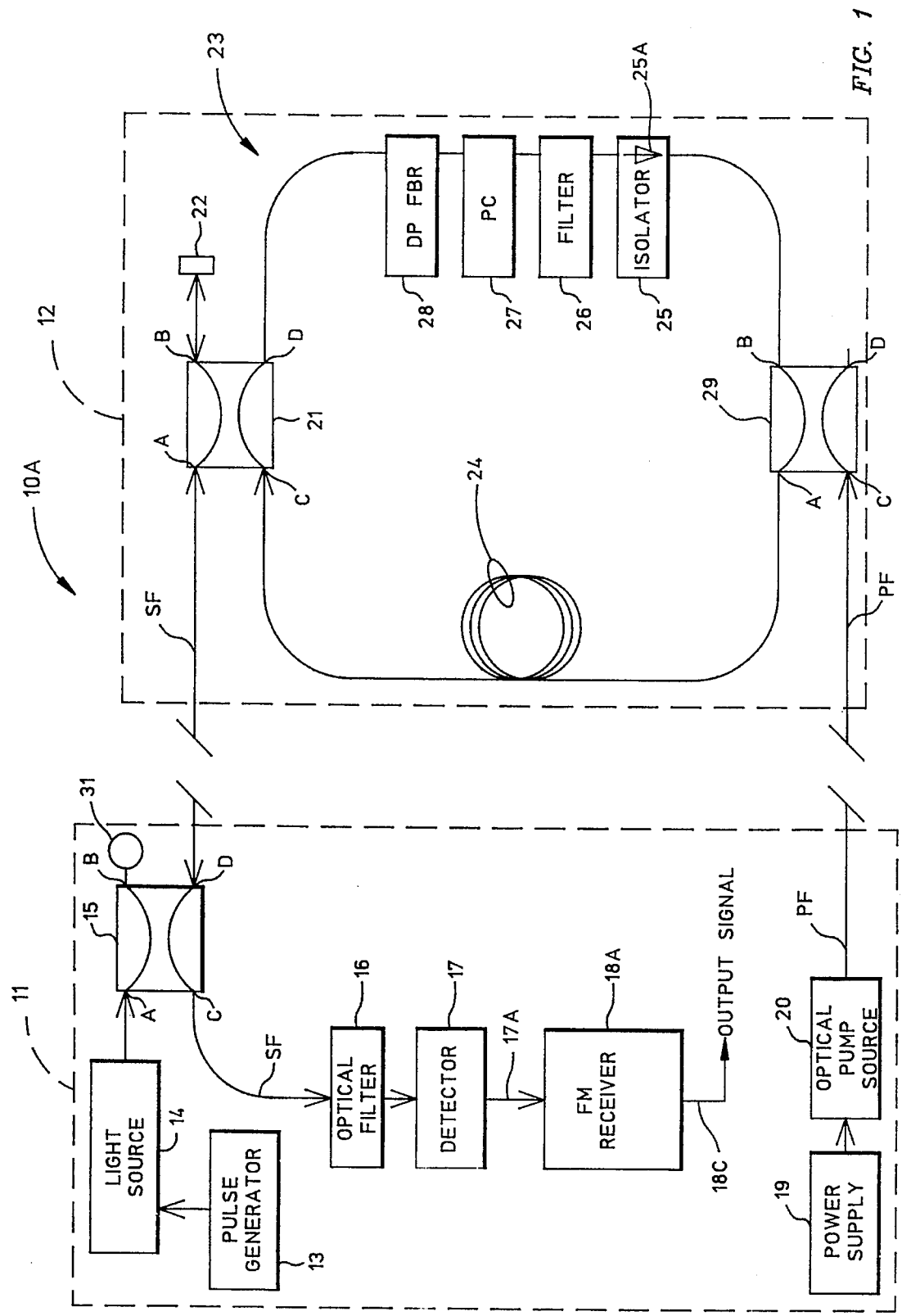
FIG. 1 illustrates a fiber optic sensor system having a single loop of optical fiber embodying various features of the present invention.

Referring to FIG. 1 there is shown a schematic diagram of fiber optic self-multiplexing amplified ring transducer system 10A embodying various features of the present invention. System 10A is organized into two subsystems: 1) a send and receive system 11; and 2) a sensor system 12. The send and receive system 11 provides an initiation light, or signal pulse and optical pump power to the sensor system 12 and then processes signal pulses received from the sensor system. The sensor system 12 includes transducing elements which may be employed to detect physical conditions of interest such as acceleration, temperature, pressure, strain, force, or the like.

Send and receive system 11 includes a pulse generator 13 which drives a light source 14. When triggered by the pulse generator 13, light source 14 generates one or more light pulses that are conveyed to a directional coupler 15. By way of example, light source 14 may be a light emitting diode (LED) or a laser diode.

Coupler 15 couples light received at port A from the light source 14 into output ports B and D. The ratio of light energy at the output ports of a coupler is determined by the design of the coupler and the wavelength of the input light. Preferably, coupler 15 may be implemented as a 10 dB coupler, which couples 1/10 of the light energy input into port A as output from port D and 9/10 of the input light energy as output from port B. The energy output from port B is absorbed by absorbing element 31 to prevent undesired reflections. Fiber optic couplers and absorbing elements are well known to persons skilled in the art, and such components are commercially available.

Pulse generator 13, light emitter 14, and coupler 15 together produce initiation light pulses that are transmitted via a signal fiber SF to the fiber optic sensor system 12, where they circulate.

Referring still to send and receive system 11 of FIG. 1, components 16, 17 and 18A receive and process signals from the sensor system 12 provided by coupler 15. A narrow band optical filter 16 filters out light that differs from the signal wavelength of the pulses generated by the light emitter 14 to improve the signal to noise ratio. A light detecting element 17, which may be a photodiode, photomultiplier tube, avalanche photodiode, or other suitable light detector, converts the light signals received from filter 16 into electrical signals. The light signals consist of a series of light pulses having a frequency modulated according to the physical condition transduced by the sensor system 12, as explained further herein.

Frequency modulation of the light pulses circulating in the sensor system 12 results in a corresponding frequency modulation (FM) of the electrical signals 17A provided by light detecting element 17. A single frequency FM receiver 18A converts the frequency modulated electrical signal 17A into a desired output signal 18C such as an amplitude modulated (AM) electronic signal, a digital electronic signal, a video display signal, a sound signal, or other suitable signal. FM receiver 18A preferably includes a preamplifier, bandpass filter, and FM demodulating electronics, as is well known.

As shown in FIG. 1, a power supply 19 of send and receive system 11 provides electrical power to drive optical pump power source 20. Optical pump power source 20 provides light energy to the sensor system 12 which is suitable for pumping an optical fiber gain medium 28 included in the sensor system. By way of example, the optical fiber gain medium 28 may be implemented as an optical fiber doped with erbium (which amplifies light having a wavelength of about 1550 nm) or other elements, depending on the wavelength of light desired to be amplified. One type of preferred optical pump power source may include one or more high power laser diodes (not shown) operating at either 980 or 1480 nm wavelength. Such laser diodes are commercially available. In accordance with the preferred embodiment shown in FIG. 1, the output of optical pump power source 20 is coupled into a pump power optical fiber PF so that the optical pump power can be transmitted to sensor system 12.

Referring still to FIG. 1, sensor system 12 includes a optical fiber loop subsystem 23 comprising a coupler 21, a transducer 24, an optical isolator 25, a narrow band optical filter 26, a polarization controller 27, an optical fiber gain medium 28, and a coupler 29. Optical isolator 25 allows light energy to propagate in one direction in the fiber loop subsystem 23 with minimal attenuation while strongly absorbing light energy propagating in the opposite direction. An example of an isolator suitable for use in the present invention is Etek Dynamics, Inc., Model PIFI-3. However, it is to be understood that the scope of the invention also includes embodiments that do not include optical isolators. The polarization controller 27 serves as a fiber based retardation plate, inducing birefringence in the fiber, and thereby rotates the fast and slow axes of the incoming field, converting the polarization state.

By way of example, as depicted in FIG. 1, optical isolator 25 allows light energy to circulate within optical fiber loop subsystem 23 in the direction indicated by the arrow 25A and prevents significant light energy from circulating in the opposite direction.

Optical filter 26 attenuates light outside a desired wavelength band to reduce noise. The center wavelength of optical filter 26 is preferably the same as the center wavelength of optical filter 16 and the center wavelength of the output of light source 14.

The polarization controller 27 passes light energy of a selected polarization in order to minimize birefringence in optical fiber loop subsystem 23. Such birefringence would otherwise result from uncontrolled changes in light polarization.

Optical fiber gain medium 28 restores light energy to the light, or optical pulses circulating in optical fiber loop subsystem 23 which have lost energy from attenuation, or by light energy exiting the fiber loop subsystem 23 through the couplers 21 or and 29 as the light pulses circulate through fiber loop subsystem 23. An example of the use of an optical fiber gain medium is described in U.S. Pat. No. 4,635,778, "Subpicosecond Fiber Laser", by Kafka et al incorporated herein by reference.

Pump energy for optical fiber gain medium 28 is received from optical pump source 20 via pump fiber PF and wavelength division multiplexer (WDM) coupler 29. A WDM coupler differs from a non-WDM coupler in that a WDM coupler is designed to couple together light energy of different wavelengths from different input ports into a common output port. WDM couplers are more efficient for coupling optical energy having different wavelengths than are non-WDM couplers, as is well known. However, use of other suitable types of coupling components in place of WDM coupler 29 is within the scope of the invention.

For system 10A, employing a single fiber loop subsystem 23, WDM coupler 29 couples substantially all of the energy at pump power wavelength from ports "C" to "B" of coupler 29. WDM coupler 29 couples very little of the light energy at the signal wavelength from port B to either port C or port D, thereby preventing undesirable loss of signal energy circulating in optical fiber loop subsystem 23.

Figure 5:
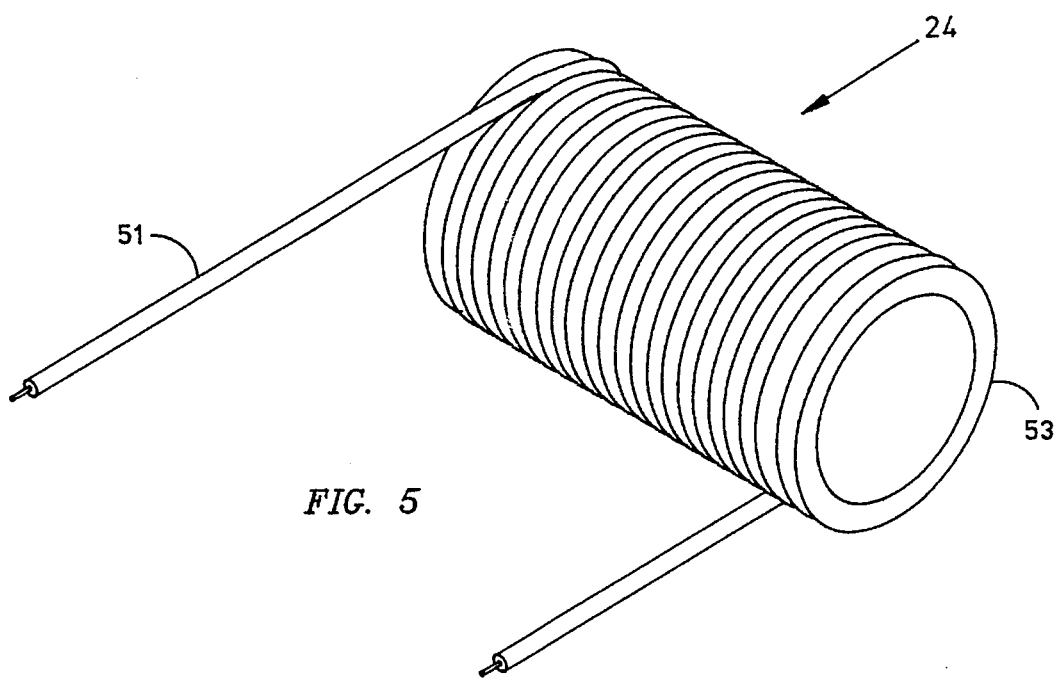
FIG. 5 illustrates a transducer implemented as an optical fiber coil.

As shown in FIG. 5, transducer 24 may be implemented as an optical fiber 51 having a length in the range of 10 to 1000 meters wrapped in a coil around a hollow mandril 53. Such a coil would be very sensitive to acoustic pressure variations which induce strain in the optical fiber 51 thereby changing the propagation time, or optical path length, of light passing through the transducer 24, and hence the circulation frequency of the fiber optic loop subsystem 23. The circulation frequency, f, is given by:

$f = c/(nL_{loop})$, where "c" is the speed of light in a vacuum, "n" is the average refractive index of the fiber optic loop subsystem, and $L_{loop}$ is the optical path length of the subsystem. In general, the present invention comprehends the use of any fiber optic transducing element in which the propagation time of light through the optical fiber changes in response to a physical condition. Examples of such fiber optic based transducing elements are well known and include electric field sensors, magnetic field sensors, and temperature sensors.

Optical coupler 21 couples optical signals between optical fiber loop subsystem 23 and send and receive system 11. Coupler 21 may be implemented as a 3 dB coupler wherein light energy received by port C is divided so that ½ of the energy exits from port B and ½ of the energy exits from port D. Light energy exiting from port B of coupler 21 is reflected by a mirror 22 and returns to coupler 21 where ½ of the light energy exits from port C and ½ of the energy exits from port A. Energy exiting port A of coupler 21 propagates into signal fiber SF, and energy exiting from port C is ultimately attenuated by optical isolator 25.

Operation of system 10A is described with reference to FIG. 1. Pulse generator 13 energizes light source 14 to produce an initiation light pulse. The initiation light pulse is injected into port A of optical coupler 15 where a portion of the initiation light pulse is coupled via port D into optical signal fiber SF.

The initiation light pulse propagates through the signal fiber SF to optical coupler 21 which couples a portion of the initiation light pulse into optical fiber loop subsystem 23 where it propagates in the direction allowed by isolator 25. The light pulse is amplified by optical fiber gain medium 28 which is selected to have an unsaturated gain "G" great enough so that "G" and the pulse power loss "L" during one pass of the light pulse through optical fiber loop subsystem 23 satisfy the relationship $G/(1-L)>1$. Such amplification causes the light pulse amplitude to increase with each pass of the light pulse through the fiber optic loop subsystem 23 until a saturation amplitude is reached. The saturation amplitude may be limited by optical pump power, length of the optical fiber gain medium, or other conditions.

Once the light, or signal pulse reaches saturation amplitude, it circulates indefinitely (possible limitations in the number of circulations will be discussed below) within the optical fiber sensor loop subsystem 23. The fundamental circulation frequency is defined as the average propagation velocity of the light pulse within optical fiber loop subsystem 23 divided by the length of the optical fiber sensor loop subsystem 23. The effect of transducer 24 is to change or modulate the circulation frequency within a bandwidth around the 20 fundamental frequency.

With each circulation of the light pulse around optical fiber loop subsystem 23, a portion of the light pulse energy is coupled from optical fiber loop subsystem 23 via port C of coupler 21 to port B of coupler 21 to produce a series of light pulses. The series of light pulses has a pulse frequency identical to the loop circulation frequency. Mirror 22 reflects signal pulses from port B back to port B of coupler 21, which transmits a portion of the light pulses into signal fiber SF via port A. Light pulses are conveyed to port D of coupler 15 which transmits a portion of the signal pulses via port C to narrow band filter 16. After being filtered by the filter 16, the light pulses are received by light detecting element 17, such as a photodiode, phototransistor, or avalanche photodiode.

Light detecting element 17 converts the series of optical signal pulses into a series of electrical pulses 17A which are received by FM receiver system 18A. As discussed above, FM receiver system 18A transforms the electrical pulses into a suitable output electrical signal 18C. Thus, it may be appreciated that frequency modulation of signal 18C represents variations in the physical condition transduced by fiber optic transducer 24.

An alternative to using an FM receiver 18A is to use a Fourier transform analyzer. A Fourier transform analyzer generates an output signal related to the frequency components comprising a time varying input signal. In general, the practice of the invention may be implemented using any electronic system which has the capability of producing a desired output signal representing the frequency of the electrical signal from light detecting element 17.

As noted above, an optical pulse propagating in the optical fiber sensor loop subsystem 23 will circulate indefinitely. However, spontaneous emission in optical fiber gain medium 28 introduces noise which is amplified by that medium. The amplified spontaneous emission (ASE) noise increases with time. If the ASE noise does not reach a steady state value that is significantly less than the amplitude of the circulating signal pulse, it may be necessary to periodically terminate the circulation of both the noise and light pulse. Termination may be accomplished by interrupting the pump power provided by power supply 19 and optical pump source 20. The circulation of a light pulse in optical fiber loop subsystem 23 is then re-established by providing an initiation pulse as described above.

In another embodiment of the present invention, the initiation of light pulses may be self-started within the optical fiber sensor loop subsystem 23. The method whereby this is done is described by Kafka, et. al, U.S. Pat. No. 4,635,778, incorporated herein by reference. [Refer to Kafka, col. 3, line 48 to col. 4, line 11.] In this alternative embodiment, illustrated as system 10B in FIG. 2, the optical path length of optical fiber loop subsystem 23 and optical fiber gain medium 28 pump power are selected so that the time required for optical fiber gain medium 28 to store energy sufficient to cause population inversion is slightly less than the circulation period of the light pulse in the optical fiber loop subsystem 23. Self-starting results when spontaneous emission noise causes a pulse to begin circulating in the optical fiber loop subsystem 23. Note that isolator 25 causes the light pulse to circulate in the direction of arrow 25B within the optical fiber loop subsystem 23 depicted in FIG. 2.

Figure 3:
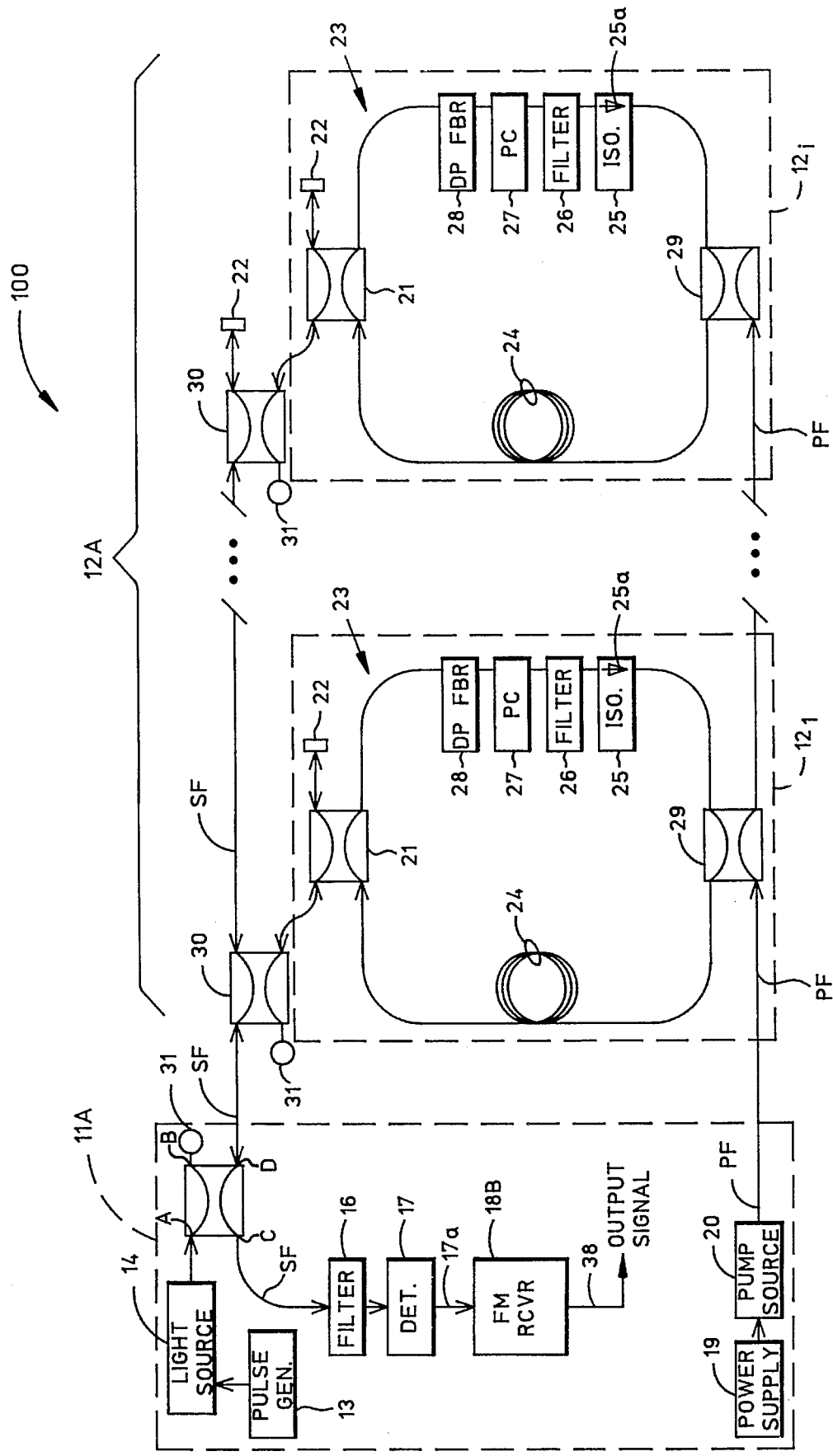
FIG. 3 illustrates a multiplexed array of fiber optic sensors wherein each fiber optic sensor loop operates at a different fundamental frequency.

Referring to FIG. 3, there is illustrated a multiplexed sensor array system 100 which includes a sensor array 12A having an N number of optical fiber sensor systems $12_i$, as for example sensor systems $12_1$, $12_2$, $12_3$, ... $12_i$, where N and i are positive integers and i may be an integer from 1 to N. An important feature of multiplexed sensor array system 100 is that the light pulse circulating in each optical fiber sensor system $12_i$ circulates at a unique circulation frequency. Each sensor system $12_i$ is disposed to independently modulate the circulation frequency of the light circulating within it. The optical signal provided by each sensor system $12_i$ is subsequently demultiplexed as explained further herein. The send and receive system 11A is identical to send and receive system 11 (FIG. 1) except that system 11A includes a multiple frequency FM receiver system 18B rather than the single frequency FM receiver system 18A of send and receive system 11. FM receiver 18B is described further herein.

Figure 2:
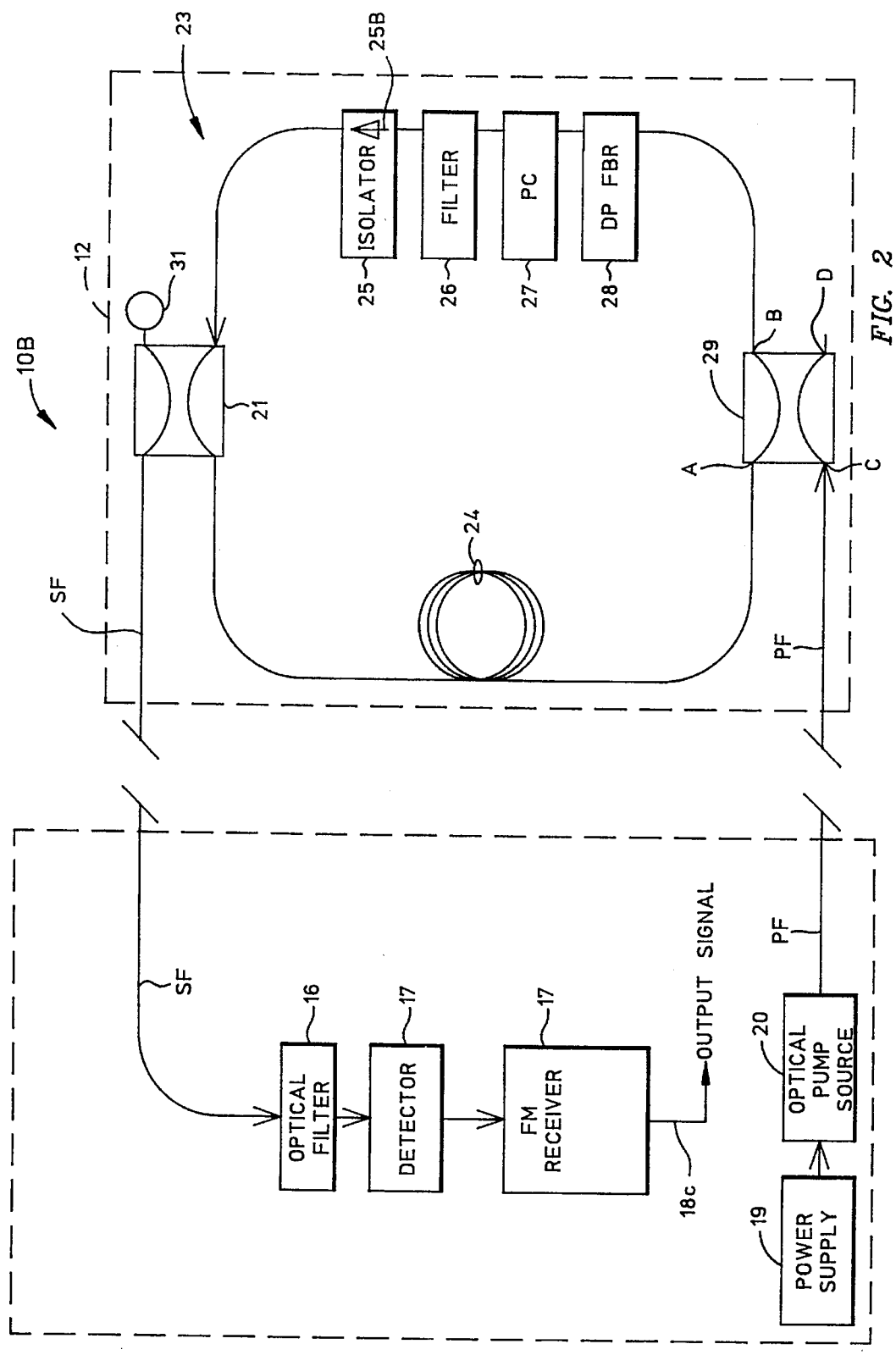
FIG. 2 illustrates another embodiment of a fiber optic sensor system having a single loop of optical fiber.

Optical fiber sensor systems $12_i$ are identical to the single sensor system 12 described in reference to FIG. 1 and FIG. 2, except that the coupling ratio of WDM couplers 29 are adjusted so that each optical fiber sensor system $12_i$ receives equal pump power from pump fiber PF. If the total number of optical fiber sensor systems $12_i$ is N, then the coupling ratio $K_i$ of each WDM coupler 29 preferably is established in accordance with the relation: $K_i=1/(N-i+1)$.

Likewise, the coupling ratio $K_i$ of optical coupler 30 of each optical fiber sensor system $12_i$ is also $K_i=1/(N-i+1)$ so that each optical fiber sensor system $12_i$ provides signal pulses of approximately equal amplitude. Couplers 30 are interconnected along signal fiber SF so that pulses from the optical fiber sensor systems $12_i$ are coupled onto signal fiber SF. An optical absorber 31 is optically coupled to coupler 30 in each optical fiber sensor system $12_i$ in order to prevent cross-talk between the sensor systems.

Figure 4:
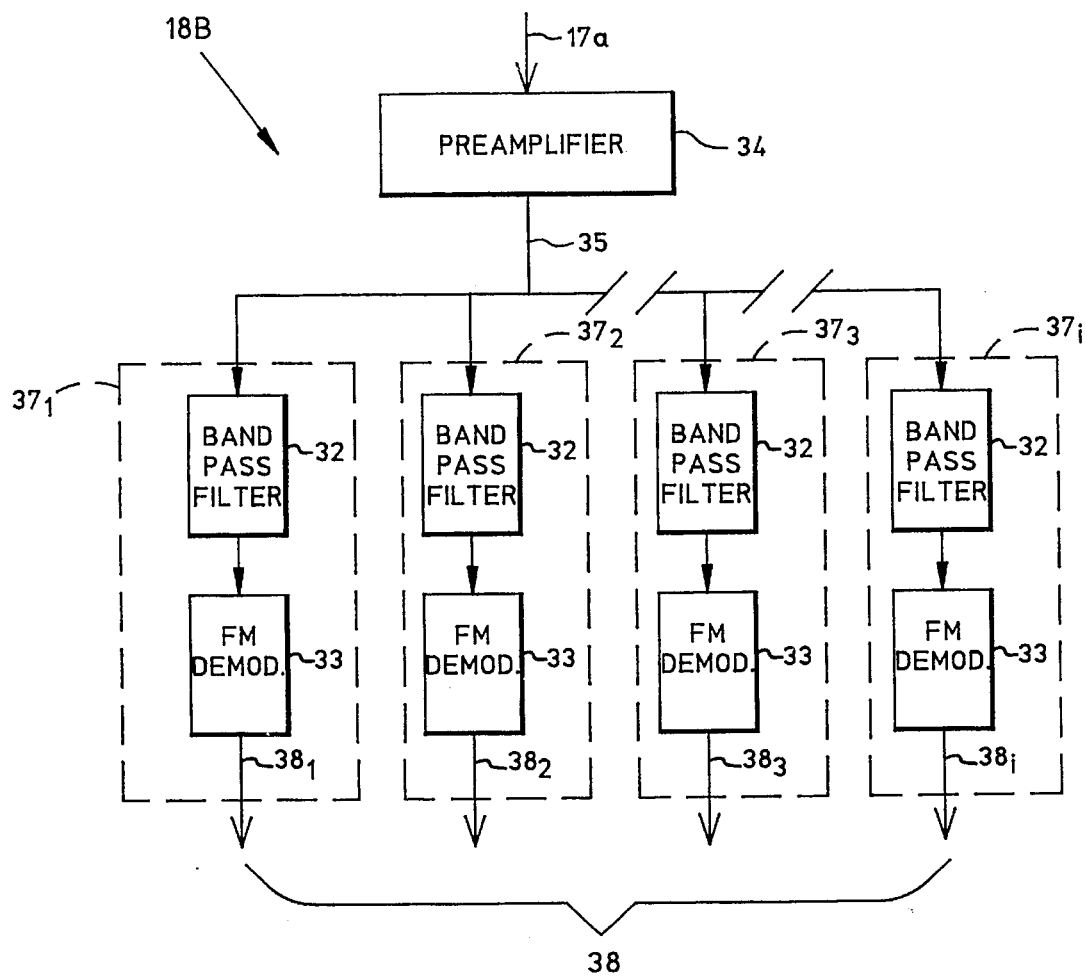
FIG. 4 illustrates receiver system for multiple frequency FM reception.

Referring to FIG. 4, multiple frequency FM receiver system 18B receives optical signal 17a from filter 17. The FM receiver system 18B includes a preamplifier 34 which provides an electrical output signal 35 to an N number of demultiplexer/demodulator circuits $37_i$ each comprising a band pass filter 32 and an FM demodulator 33, where N and i have previously been defined. Each demultiplexer/demodulator circuit $37_i$ demodulates the optical signal sampled from a fiber sensor system $12_i$ having the corresponding index "i". The preamplified signal 35 is filtered by a narrow band pass electrical filter 32 which filters out electrical signals having a frequency that differ from the circulation frequency of the pulses generated by the ith sensor loop $12_i$. The FM demodulator 33 of each demultiplexer/demodulator $37_i$ receives the filtered electrical signal 35 through a filter 32 and generates an output signal $38_i$ functionally related to the circulation frequency of the light pulses circulating in a fiber sensor system $12_i$ having the corresponding index "i". All of the output signals $38_i$ collectively comprise output signal 38.

Figure 6:
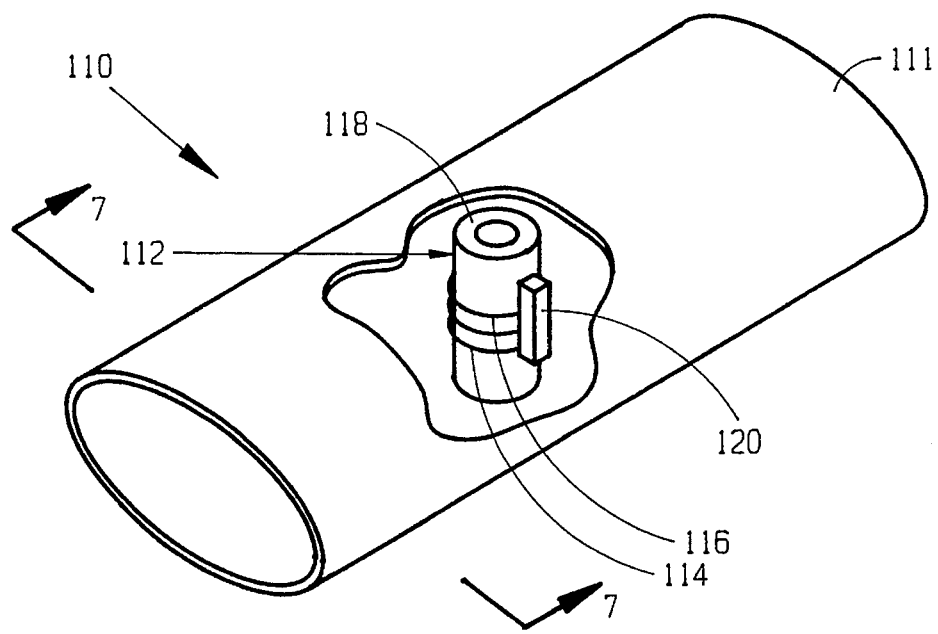
FIG. 6 is a perspective partially cutaway view of a force transfer column sensor according to the present invention.
Figure 7:
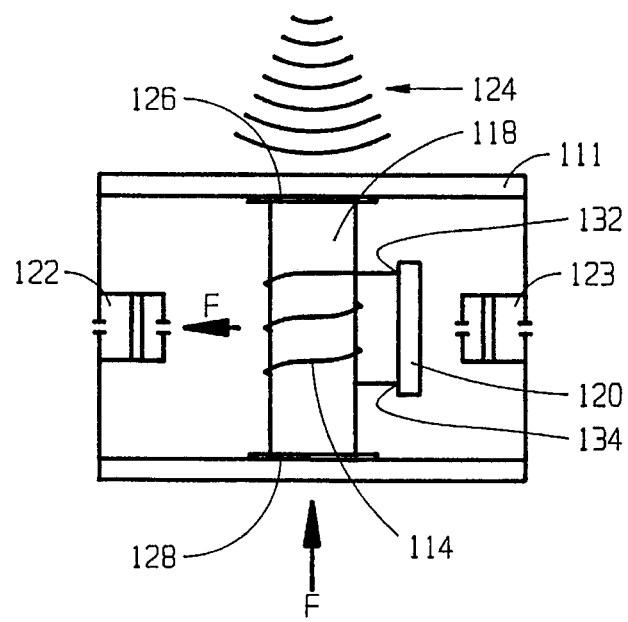
FIG. 7 is a sectional view of the sensor taken along line 7—7 in FIG.6, showing a cross-sectional view of a pressure equalizer.

FIGS. 6 and 7 illustrate an acoustic sensor 110 according to the present invention for use as a flextensional transducer at various altitudes or ocean depths, to sense perturbations, such as sound waves, with minimum disturbance from low frequency environmentally induced perturbations. Sensor 110 generally includes a shell or housing 111 for encasing a transducer 112 formed of a length of single monomode optical fiber 114 wound into a loop 116 about a force transfer column 118. It also includes an optical circuit or detector 120 that is operably coupled to optical fiber 114, for detecting and processing stress or strain induced in optical fiber 114 in the manner described above with respect to FIGS. 1–5, and a pressure equalizer 122 which may include a "dash pot" damper valve.

Shell 111 is a generally hollow, closed structure. In the illustrated embodiment, shell 111 has an elliptical cross-section. It may be made of a compliant material, such as aluminum or glass fiber reinforced composites. Shell 111 acts as an interface between the external environment external to it and the internal environment in which transducer 112 is contained. It transfers perturbations generated in the external environment to transducer 112. While a particular shape and material composition have been described, it should be understood that other shapes and material compositions for shell 111 are also contemplated by the present invention.

Optical fiber 114 includes loop 116 coiled around force transfer column 118. Loop 116 may comprise one or more partial or complete loops. Additionally, optical fiber 114 is secured in at least two locations to column 118, or, alternatively, it can be fixed or continuously bonded to column 118 throughout its length. Optical fiber 114 establishes an optical path of a predetermined length, when it is in an unstrained condition. Optical circuit 120 provides an energy source which generates energy modulated by external perturbations, thereby detecting strain fluctuations resulting from such perturbations in optical fiber 114. The energy source can be a conventional single laser source (not shown) that includes a single laser-diode initiator optically connected to one terminal end 132 of optical fiber 114 in order to inject a suitable optical signal into optical fiber 114. Optical circuit 120 may include one or more photodetectors as described above that are optically connected to the other terminal end 134 of optical fiber 114, for providing light intensity readings. A suitable optical circuit is described above in relation to FIGS. 1–5.

Force transfer column 118 includes a generally cylindrical mandrel, that may be formed of resilient material, such as polyurethane flexural spring (PUFS), so that column 118 is responsive to and compliant under the force F of external perturbations 124. The mandrel may have a circular cross section as illustrated although other designs are within the scope of the present invention. A flexible urethane elastomer may be suitable for its softness, firmness, ability to satisfy desired structural requirements, and a low Young's modulus (insignificant volumetric reduction) at various operating depths. Polyurethane permits an effective transfer of compressive force F acting on column 118 into a tensile force acting on fiber optic loop 116. It is within the scope of the present invention however that column 118 could be composed of a number of alternative elastomeric polymers that will provide transfer of force and external pressure perturbations to strain in fiber optic loop 116. Column 118 may convert acoustic energy to radial displacement of the column.

As illustrated in FIG. 7, column 118 is placed inside shell 111 such that the inner surface of shell 111 supports upper and lower ends 126, 128 of column 118. Column 118 has predetermined bulk modulus and Poisson's ratio for allowing a controlled strain to be developed into optical fiber 114. Column 118 is oriented such that compressive force F generated by external dynamic perturbations acts along the axial direction of column 118.

Pressure equalizer 122 acts as a high frequency band pass filter, and equalizes any pressure differentials between the pressure inside shell 111 and the external pressure, as may result for instance from the depths or altitudes of sensor 110. Pressure equalizer 122 allows optical circuit 120 to respond only to forces having a rate of change beyond a threshold level. For instance, pressure equalizer may allow sensor 110 to sense only high frequency dynamic perturbations 124 emanating from a target source to the exclusion of slow pressure changes. While the illustrated embodiment of sensor 110 is shown to include two "dash pot" damper valves 122 and 123 for the simplicity of their operation and their reliability, it should be understood that other high frequency bandpass filters, such as orifice control, porous wall, damped micro check valves or similar other devices can alternatively be used, as can any equalizer that can eliminate unwanted changes.

In operation, light from optical circuit 120 is injected into the loop portion of optical fiber 114 via terminal end 132, and is coupled out of optical fiber 114 via terminal end 134 back to optical circuit 120, where it is received by one or more photodetectors. In the absence of perturbations, no strain is induced in optical fiber 114, thus indicating the absence of an emanating source. However, when column 118 is subjected to perturbations 124, also represented by the force F, optical fiber 114 is strained. This strain may be detected as modulation of the photocurrent in optical fiber 114, which may be used to provide an indication of the presence of an emanating source.

More specifically, perturbations 124 from an acoustic source cause an axial compression of column 118 which radially expands due to Poisson's effect. Such radial expansion of column 118 causes axial straining of fiber optic loop 116, thus inducing an axial tensile force represented by the arrow f and the corresponding strain in optical fiber 114. Optical circuit 120 detects the induced strain, and determines the relation between the induced strain and the corresponding modulation of the light propagating through optical fiber 114 relative to the light in the unstrained optical fiber 114.

Figure 8:
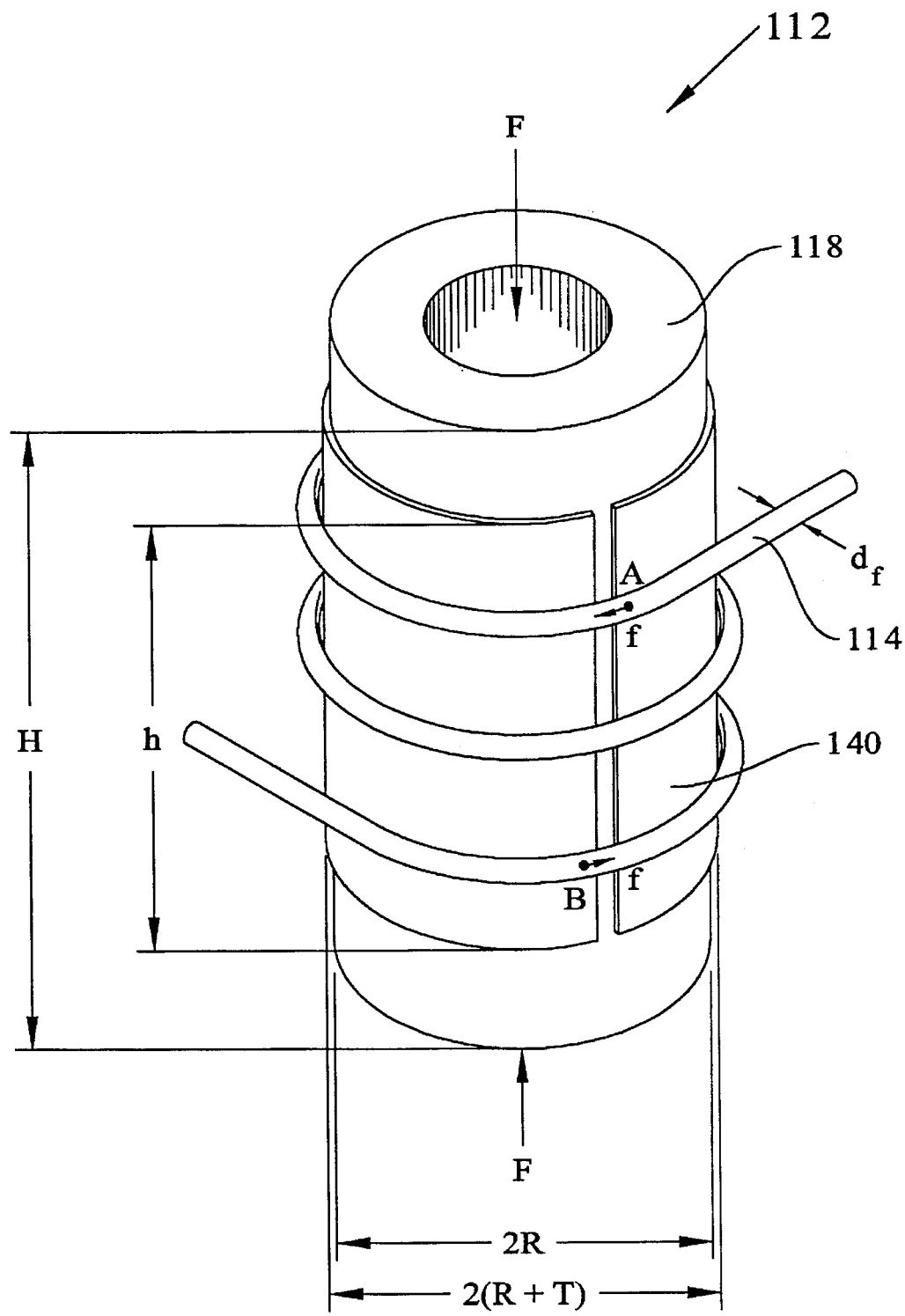
FIG. 8 is a schematic isometric view of a transducer forming part of the sensor of FIGS. 6 and 7.

Referring now to FIG. 8, transducer 112 is optionally fitted with a collar 140. In one embodiment, collar 140 may be a thin-walled fiber fixation collar disposed between the outer surface of column 118 and optical fiber 114 in order to provide a convenient fixation surface of optical fiber 114 to column 118 at contact points A and B and/or to provide uniformity in the transfer of force from transfer column 118 to optic loop 116. Collar 140 may be made of acrylic material in the form of a split cylindrical shell that fits snugly around column 118.

A compressive test was conducted using a model similar to the one shown in FIG. 8, with the force transfer column 118 being made of polyurethane with Young's modulus E and Poisson's ratio v. Column 118 was cylindrically shaped with a circular cross section and had outer radius R and height H. Collar 140 was made of acrylic in the form of the split circular cylindrical shell with inner radius R, thickness t, and height h. Optical fiber 114 had a load bearing diameter $d_f$, Young's modulus $E_f$, and Poisson's ratio $v_f$. Optical fiber 114 was wrapped n turns around collar 140 and column 118.

By applying the theory of elasticity described in Sokolnikoff, I. S., "Mathematical Theory of Elasticity", McGraw-Hill Book Company, Inc., New York, 1956, it is possible to express the hoop strain $\epsilon_h$ in column 18 and axial strain $\epsilon_f$ in optical fiber 114, by the following equations:

$$\epsilon_h = -v/E[\sigma + (1-v)(P/v)] \quad (1)$$

$$\epsilon_f = P.R/E_f.t_e. \quad (2)$$

In the foregoing equations (1) and (2) the applied strain σ to column 118 and the effective thickness $t_e$ of the wrapped optical fiber 114 are given by the following equations (3) and (4), respectively:

$$\sigma = F/A, \ (F \leq 0) \quad (3)$$

$$t_e = (n-1) A_f/h, \ (n \geq 100), \quad (4)$$

where the cross-sectional areas A and $A_f$ of column 118 and optical fiber 114 are given by the following equations (5) and (6), respectively:

$$A = \pi.R^2 \quad (5)$$

$$A_f = \pi.d_f^2/4. \quad (6)$$

Since the thickness of collar 140 was very small relative to the radius of column 118, and the deformation test of transducer 112 is axisymmetric, it can be shown that the hoop strain $\epsilon_h$ in column 118 and the axial strain $\epsilon_f$ in optical fiber 114 are about equal, as indicated by the following equation (7):

$$\epsilon_h \approx \epsilon_f. \quad (7)$$

By substituting equations (1) and (2) into equation (7), the pressure P that develops between the contact surface of column 118 and collar 140, can be expressed by the following equation (8):

$$P = [(E_f.t_e)/R]. \ \{-[1/(1+\alpha)]. \ [v.\sigma/E]\}, \quad (8)$$

where the correction factor α is given by the following equation (9):

$$\alpha = (1-\sigma).(E_f.t_e)/(E.R). \quad (9)$$

By substituting equation (8) into equation (2), the axial strain $\epsilon_f$ can be expressed by the following equation (10):

$$\epsilon_f = -[1/(1+\alpha)].(v.\sigma/E). \quad (10)$$

By denoting $\sigma_f$ as the axial stress in the optical fiber 114, one obtains the following equations (11A) and (11B):

$$f = \sigma_f.A_f, \quad (11A)$$

$$\sigma_f = E_f.\epsilon_f. \quad (11B)$$

Using equations (3), (10) and (11), the desired load transfer formula can be expressed by the following equation (12):

$$f = -(v.E_f.A_f.F)/[(1+\alpha).E.A]. \quad (12)$$

For applying equation (12), parameters representing suitable geometry and estimated material properties of transducer 112 are listed below:
For force transfer column 118:
 E=300 psi,
 v=0.5,
 R=1.375 inch, and
 H=5.5 inch.
For fiber fixation collar 140:
 R=1.375 inch,
 t=1/16 inch, and
 h=4.5 inch.
For optical fiber 114:
 $d_f$=0.005 inch, $E_f=10\times10^6$ psi, $v_f=0.22$, and $n/h=100$ loops/inch.

With these parameters, equation (12) requires:

F=−233 lb (compression)

to be applied to force transfer column 118 in order to induce an axial tensile force:

f=0.5 lb (tension)

in optical fiber 114. Furthermore, by using equations (3) and (11A), the corresponding stresses in column 118 and optical fiber 114, respectively, are calculated as follows:

σ=−38 psi (compression) and $\sigma_f$=0.255×10⁵ psi (tension).

The foregoing quantitative results indicate that sensor 110 may provide an effective lead transfer.

To validate use of the above equations for obtaining these quantitative results, a correlation is shown below between the axial strains predicted by these equations and the measured axial strain induced in optical fiber 114 as a function of the axial compressive force 124 applied to the polyurethane cylinder 118 around which the fiber is coiled.

Toward this aim, an experiment was conducted to indirectly measure the strain by first determining the phase shift (Δθ) on the signal transmitted through the fiber 114 and then applying the following strain-phase shift equation (13):

$$\epsilon_f = \Delta L/L = [(1/L)(\Delta L/\Delta\tau)\Delta\tau] = [(1/L)(\Delta L/\Delta\tau)[\Delta\theta/(\Delta\theta/\Delta\tau)]] = [(1/L)(\Delta L/\Delta\tau)[\Delta\theta/360°\cdot f]], \quad (13)$$

where $\epsilon_f$ is the optical fiber strain, L is the length of optical fiber 114, ΔL is the resulting change in length of optical fiber 114, Δτ is the time increment, and f is the frequency of the signal passing through optical fiber 114.

The empirical data tabulated in the following Table I provide values for the measured phase shifts resulting from an applied force, measured in pounds (lbs), where A, B, C and D indicate four data sets of phase shift in degrees. "Avg" indicates the average phase shift over the four data sets. "Avg w/o A" indicates the average phase shift without data set A:

TABLE I

| Force | A | B | C | D | Avg | Avg w/o A |
|---|---|---|---|---|---|---|
| 0 | 0 | 0 | 0 | 0 | 0 | 0 |
| 100 | 0.6 | 0.5 | 0.6 | 0.6 | 0.575 | 0.567 |
| 200 | 1.3 | 1.8 | 1.9 | 1.8 | 1.7 | 1.83 |
| 300 | 2.2 | 2.7 | 2.7 | 2.7 | 2.575 | 2.7 |
| 400 | 3 | 3.6 | 3.8 | 4 | 3.6 | 3.8 |
| 500 | 4.3 | 5.1 | 5.5 | 5.6 | 5.125 | 5.4 |

Figure 9:
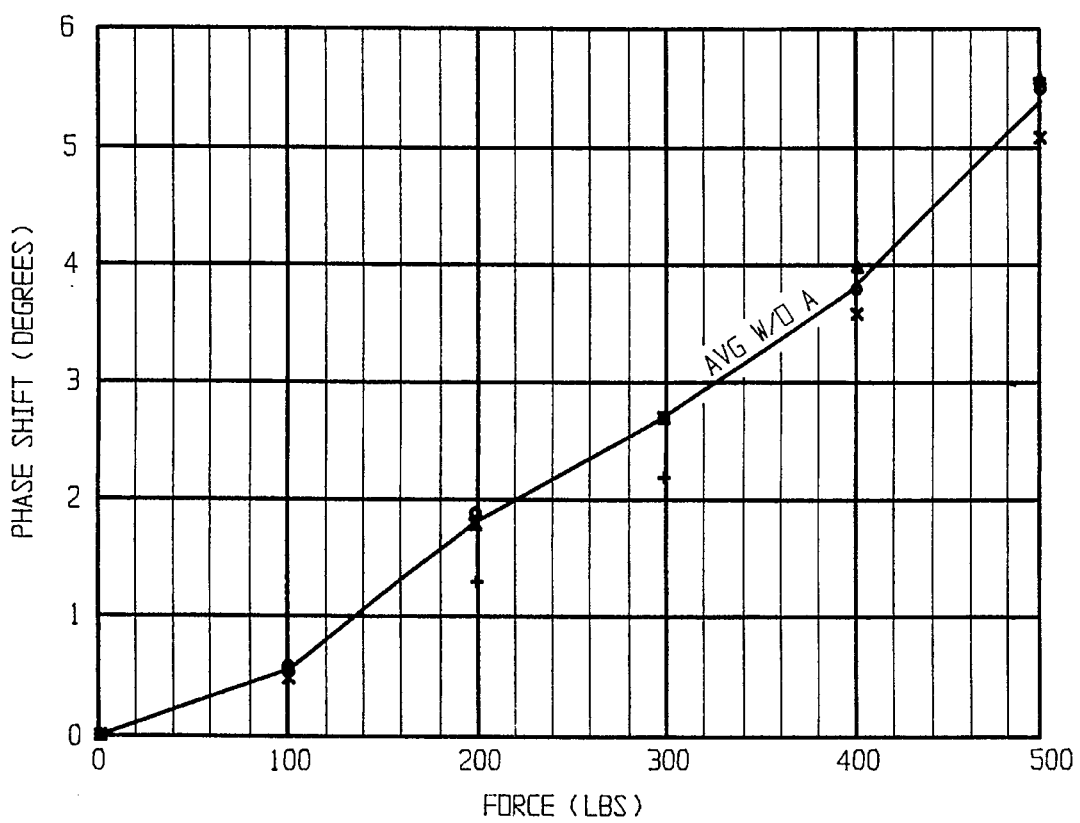
FIG. 9 is a graphical representation of empirical values illustrating the force applied on an optical fiber used in the sensor of FIGS. 6, 7, and 8, versus the phase shift of the signal passing through that optical fiber.

The data is plotted in FIG. 9. The solid line in FIG. 9 represents the average data without data set A ("+"), which does not seem to agree with the other data sets. Nevertheless, both the average over four data sets and the average without data set A are considered in the correlation.

The following Table II tabulates values for the strain $\epsilon_f$ calculated with equation (13) from the measured phase shift Δθ (Table I).

TABLE II

| Axial Compressive Force, F (lbs) | Axial Strain Induced in the Optical Fiber, $\epsilon_f$ (×10⁻³) | |
|---|---|---|
| | Average (Data Sets A–D) | Average (Without Data Set A) |
| 0 | 0.0 | 0.0 |
| 100 | 0.4149 | 0.4091 |
| 200 | 1.2266 | 1.3203 |
| 300 | 1.8579 | 1.9481 |
| 400 | 2.5974 | 2.7417 |
| 500 | 3.6977 | 3.8961 |

In this calculation, a value of (Δτ/ΔL) of 35 ps/cm is used. This value accounts for the effective index of the optical fiber's mode and the strain-optic effect. When optical fiber 114 is strained, the material becomes less dense and, therefore, has a reduced index of refraction. The strain-optic effect effectively speeds up the optical signal by about 30% when compared to an unstrained optical fiber. Other values used in the above calculation are L=100 meters, and f=11 MHz.

To predict the strain $\epsilon_f$ on optical fiber 114, equation (14) is derived from the foregoing equations (4), (9), (11), and (12) as follows:

$$\epsilon_f=(-F\cdot\sigma)/\{\pi R\cdot[RE+[(n-1)\cdot A_f\cdot E_f\cdot(1-v)/h]]\}. \quad (14)$$

To reduce equation (14), the following numerical values may be used:

R=1.375 inch, n=434 loops, h=3.9 inches, $A_f$=π/4 (0.005)²=1.9635×10⁻⁵ in², and $E_f$=10×10⁶ psi.

Using these values, equation (14) is reducible to the following equation (15) which illustrates that strain $\epsilon_f$ closely depends on Poisson's ratio of polyurethane v:

$$\epsilon_f=(-F\cdot v)/[5.9395E+94169\,(1-v)]. \quad (15)$$

An experiment was conducted to determine v as well as E. In this experiment, a circular cylinder of polyurethane with a diameter D and height H was subjected to several levels of axial compressive force F. The following Table III tabulates the measured values for diameter D and height H as a function of the axial compressive force F, up to 200 pounds:

TABLE III

| Axial Compressive Force, F (lbs) | Diameter, D (inches) | Height, H (Inches) |
|---|---|---|
| 0 | 2.75 | 4.350 |
| 100 | 2.775 | 4.472 |
| 200 | 2.806 | 4.550 |

The following Table IV tabulates values for Young's modulus E and Poisson's ratio v, including those calculated from Table IV for F≦200 lb. and those assumed to take the same values as F=200 lb. for F>200 lb.:

TABLE IV

| Axial Compressive Force, F (lbs) | Young's Modulus, E (psi) | Poisson's Ratio, v | Remarks |
|---|---|---|---|
| 0 | — | — | — |
| 100 | 590 | 0.324 | Measured |
| 200 | 640 | 0.403 | Measured |
| 300–500 | 640 | 0.403 | Assumed |

The following Table V tabulates values for the optical fiber strain $\epsilon_f$ predicted by equation (15) using Table IV.

TABLE V

| Axial Compressive Force, F (lbs) | Optic Fiber Strain, $\epsilon_f$ | | |
|---|---|---|---|
| | Value ($\times 10^{-3}$) | Deviation from the Measured Value (%) | |
| | | Based on Average (Over A–D) | Based on Average (without A) |
| 0 | 0 | 0 | 0 |
| 100 | 0.4824 | 16.27 | 17.91 |
| 200 | 1.3429 | 9.48 | 1.71 |
| 300 | 2.0143 | 8.42 | 3.4 |
| 400 | 2.6857 | 3.4 | −2.04 |
| 500 | 3.3572 | −9.21 | −13.83 |

Table V also shows the deviations of the predicted values from the corresponding measured values, based on both the average of the four data sets A, B, C, and D and the average without the data set A. Table V seems to indicate that the deviation of the theoretical predicted values from the measured values for all axial compression forces may be less than 18%, which is deemed a reasonably good correlation.

Although illustrative embodiments of the present invention have been described with reference to the accompanying drawings, it is to be understood that the invention is not limited to these precise embodiments. The presently preferred embodiments are to be considered as merely illustrative and not restrictive, and a latitude of modifications, changes and substitutions is intended to be encompassed by the foregoing disclosure.

What is claimed is:

1. A fiber optic sensor system, comprising:

a first optical power source for generating a light pulse;

an optical fiber loop system coupled to receive said light pulse, wherein said light pulse circulates in said optical fiber loop system at a circulation frequency, and which includes:

a transducer which modulates said circulation frequency in response to detecting a changing physical condition;

an optical fiber gain medium for amplifying said light pulse;

a second optical power source for providing optical energy to said optical fiber gain medium; and a detector system for receiving a portion of said light pulse received from said optical fiber loop system and generating an output signal representing said circulation frequency.

2. The system of claim 1 wherein said first optical power source includes a laser diode.

3. The system of claim 1 wherein said first optical power source includes a light emitting diode.

4. The system of claim 1 wherein said transducer includes a coil of optical fiber.

5. The system of claim 1 wherein said optical fiber gain medium includes an erbium doped fiber amplifier.

6. The system of claim 1 wherein said detector system includes a photodiode.

7. The system of claim 1 wherein said detector system includes a phototransistor.

8. The system of claim 1 wherein said detector system includes a avalanche photodiode.

9. The system of claim 1 wherein said optical fiber loop system includes an optical isolator.

10. The system of claim 1 wherein said optical fiber loop system includes a polarization controller.

11. The system of claim 1 wherein said detector system includes a Fourier analyzer.

12. The system of claim 1 wherein said detector system includes an FM receiver.

13. The system of claim 1 further including a first optical coupler optically coupled between said first optical power source and said optical fiber loop system.

14. The system of claim 1 further including a second optical coupler optically coupled between said optical fiber loop system and said second optical power source.

15. A fiber optic sensor system, comprising:

a first optical power source for generating a light pulse;

an optical fiber loop system coupled to receive said light pulse, wherein said light pulse circulates in said optical fiber loop system at a circulation frequency, and which includes:

a transducer which responds to a changing physical condition by modulating said circulation frequency;

an optical fiber gain medium for amplifying said light pulse; and a detector system for transforming a portion of said light pulse received from said optical fiber loop system into an output signal representing said circulation frequency.

16. A multiplexed fiber optic sensor system, comprising:

a first optical power source for generating a light pulse;

multiple optical fiber loop systems coupled to receive a portion of said light pulse, wherein said portion of said light pulse circulates in each said optical fiber loop system at a unique circulation frequency, where each said optical fiber loop system includes:

a transducer which modulates said circulation frequency in response to detecting a changing physical condition;

an optical fiber gain medium for amplifying said portion of said light pulse circulating in said optical fiber loop system;

a second optical power source for providing optical energy to said optical fiber gain medium in each of said fiber optic loop systems; and a detector system optically coupled to receive a portion of said light pulse from said optical fiber loop systems for generating output signals representing said circulation frequencies of said light pulses circulating said optical fiber loop systems.

17. The system of claim 16 wherein said first optical power source includes a laser diode.

18. The system of claim 16 wherein said first optical power source includes a light emitting diode.

19. The system of claim 16 wherein said transducer of each said optical fiber loop system includes a coil of optical fiber.

20. The system of claim 16 wherein said optical fiber gain medium of each said optical fiber loop system includes an erbium doped fiber amplifier.

21. The system of claim 16 wherein said detector system includes a photodiode.

22. The system of claim 16 wherein said detector system includes a phototransistor.

23. The system of claim 16 wherein said detector system includes an avalanche photodiode.

24. The system of claim 16 wherein each said optical fiber loop system includes an optical isolator.

25. The system of claim 16 wherein each said optical fiber loop system includes a polarization controller.

26. The system of claim 16 wherein said detector system includes a Fourier analyzer.

27. The system of claim 16 wherein said detector system includes an FM receiver.

28. The system of claim 16 further includes a first optical coupler optically coupled between said first optical power source and said optical fiber loop systems.

29. The system of claim 16 further includes a second optical coupler optically coupled between said optical fiber loop systems and said second optical power source.

* * * * *